Feb. 25, 1969 K. E. HUNTER 3,429,476
PIPE OR VESSEL CLOSURE
Filed Jan. 26, 1966

Inventor:
Keith Ellis Hunter
By Baldwin & Wight
Attorneys

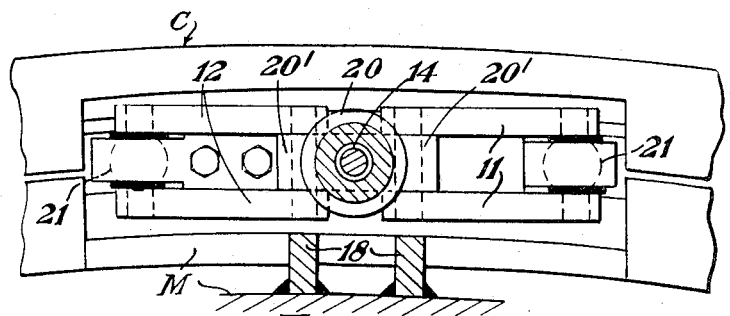
Fig. 5.
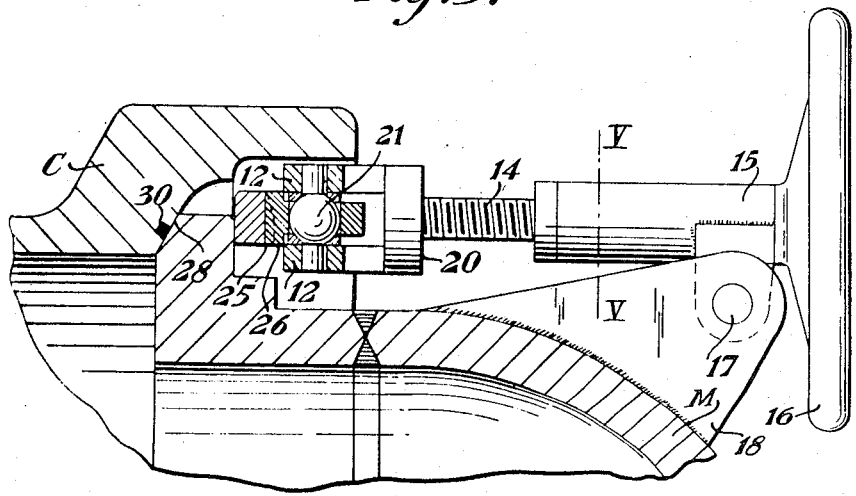
Fig. 4.
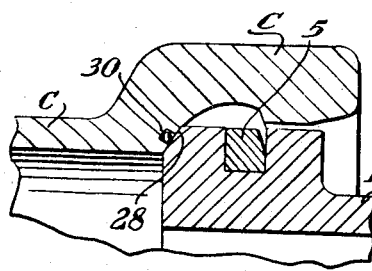
Fig. 6.A
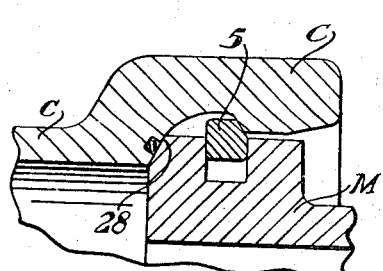
Fig. 6.B

United States Patent Office 3,429,476
Patented Feb. 25, 1969

3,429,476
PIPE OR VESSEL CLOSURE
Keith Ellis Hunter, Worksop, England, assignor to General Descaling Company Limited, Worksop, England, a company of the United Kingdom
Filed Jan. 26, 1966, Ser. No. 523,194
U.S. Cl. 220—55     10 Claims
Int. Cl. B65d *45/32;* A47j *36/10, 27/08*

ABSTRACT OF THE DISCLOSURE

This disclosure relates to a releasable connection between a closure and a vessel, the closure and vessel having sealing surfaces in contacting engagement, the closure being provided with a recess carrying a locking ring having a peripheral surface for wedging engagement against a peripheral surface of the vessel upon the expansion of the ring in a radially outward direction whereupon the sealing surfaces are maintained in intimate contacting engagement, and toggle linkage means for expanding the locking ring.

---

The object of the invention is to provide a means of evenly forcing together circumferential faces on the pipe or vessel and a closure to produce a seal and support the load on the closure member when the pipe or vessel is under pressure.

According to the invention, a closure device for a vessel or pipe comprises a closure member fitting the orifice to be closed, seating surfaces formed respectively on the pipe or vessel and the closure member, by which the closure member, when in position, is located, and a ring element or elements of wedge-shaped radial cross-section capable of expansion and contraction and adapted, when expanded, to engage a shoulder on the pipe or vessel.

In the preferred embodiment of the invention, the closure member is provided with a ring element made up of a single split ring or of two or more parts, the ends of the ring or adjacent parts being connected to means by which they may be forced apart or contracted in order to expand or contract the ring or parts thereof.

As applied to a closure for a pipe, the end of the pipe is of increased diameter to form a closure ring in which is an internal circumferential groove. Between those parts of the interior of the pipe having normal and enlarged diameter is a frusto-conical shoulder providing a seating surface and embedded in a groove in this surface is a resilient deformable O-ring. The dimensions of the O-ring are such that it will, in its normal (uncompressed) condition, project above the surface of the shoulder, and thus, when the closure member is forced towards the shoulder, the O-ring is compressed and sets up the necessary seal.

The closure member, which may be of dome shape, is provided with a first outwardly extending flange having a bevelled edge for contact with the shoulder when the closure member is in position. A second peripheral outwardly extending flange is also provided, somewhat nearer the crown of the dome than the first flange, between which two flanges the locking ring is retained.

The locking ring may be made up of a number of parts, of which preferably there are two in number in the form of a semicircle, a suitable material being hardened tempered steel. The parts are connected by toggle linkages which operate to force the parts into the groove in the pipe. Each linkage comprises a pair of links, a connecting link and actuating screw threaded in a support pivotally attached to the closure member by means of a pivot and bracket.

Screwing up the actuating screw forces apart the outer ends of the links which are attached to the ends of adjacent parts of the locking ring through ball bearings in rubber mountings, thus increasing the diameter of the ring and forcing it into the groove. Unscrewing the actuating screw draws the ends towards each other, reducing the diameter of the ring and withdrawing it from the groove.

The invention is illustrated in the accompanying drawings, in which:

FIGURE 4 is a corresponding longitudinal section taken on the line IV—IV of FIGURES 1 and 3.

FIGURE 5 is a transverse section of the line V—V of FIGURE 4.

FIGURES 6A and 6B are sectional views on the line VI—VI of FIGURE 1 showing the locking ring respectively in the inoperative and operative positions.

Figure 2:
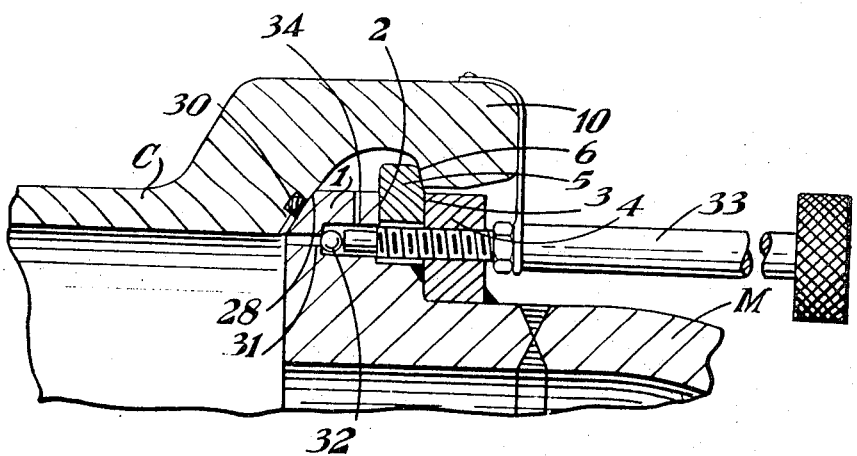
FIGURE 2 is a fragmentary section on the line II—II of FIGURE 1 with the locking ring in its annular housing.
Figure 3:
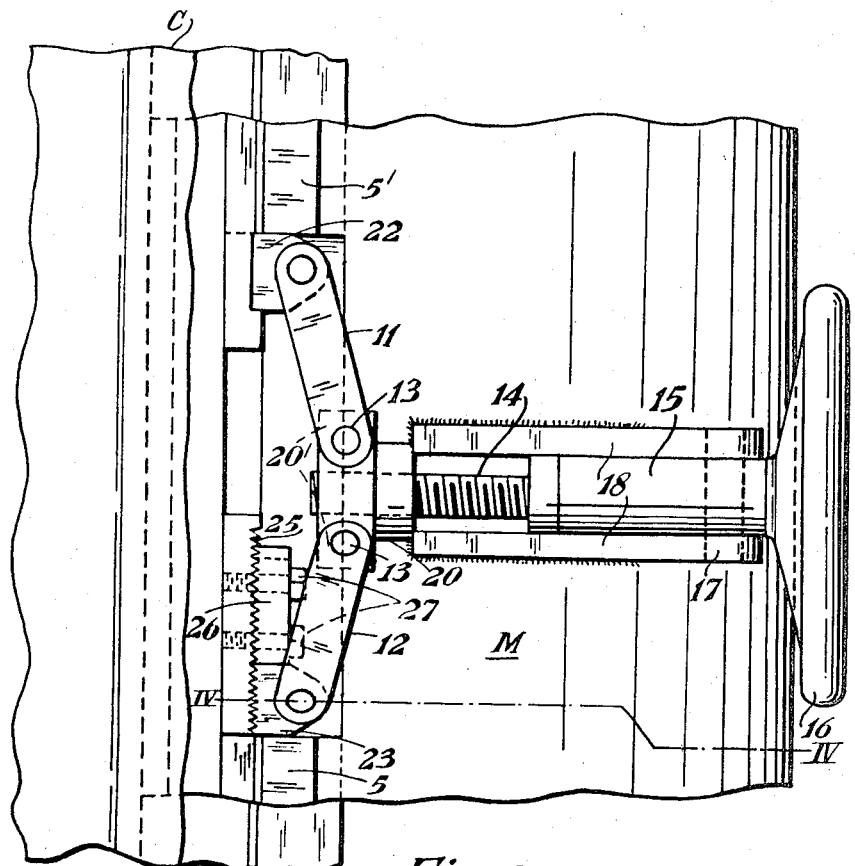
FIGURE 3 is a plan view of the toggle mechanism with the locking ring housing therefor broken away.

Referring first to FIGURES 2 to 4 of the drawings, C indicates a closure ring which is attached to or forms part of the pipe end, the closure member, which is of a size to fit into the orifice in the closure ring C to be closed, being indicated at M (FIGURE 2).

The closure member M which is dome shaped, terminates in a circumferential rib 1, on which is formed a guide face for cooperation with a similar guide face 3 provided on the inside of a similar metal rib part or flange 4, which conveniently is secured to the member M by welds, the member M being formed with a circumferential shoulder to locate part 4. Mounted within the groove formed between the annular surfaces 2, 3 is a ring element 5 capable of expansion and contraction and adapted, when expanded, to make sealing contact with a radial circumferentially extending surface on an inwardly extending shoulder 10 on the closure ring C.

As shown, the ring element 5 may be formed with a taper surface 6 to engage behind a correspondingly tapered surface on the shoulder 10.

Figure 1:
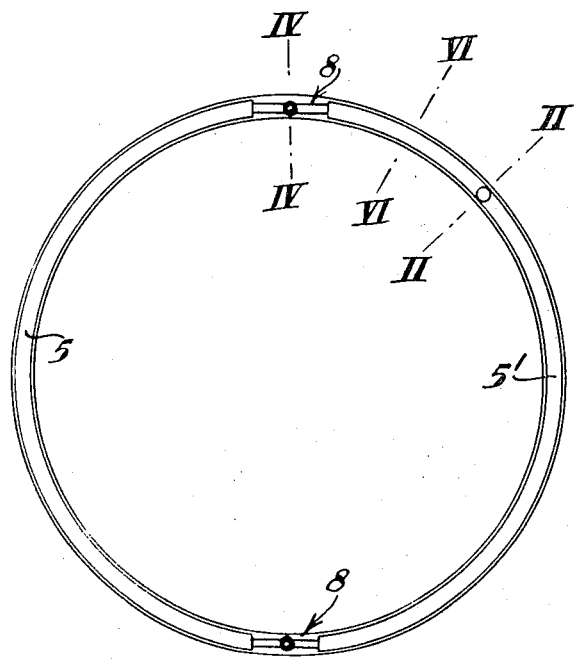
FIGURE 1 is a diagrammatic axial or end-on view of the two-part locking ring the annular housing in which it is located being omitted.

In the embodiment illustrated, the ring element is formed in two parts of sections 5, 5' (see FIGURE 1), the two parts being in the form of semi circular parts or half rings, being connected to one another at their adjacent ends by means of a toggle linkage indicated generally at 8 (see FIGURE 1).

Referring now to FIGURES 3, 4 and 5, each toggle device comprises pairs of links, indicated respectively at 11, 12 pivotally anchored at their inner ends at 13 to a collar 20 threaded onto a screw threaded spindle 14 and at their outer ends respectively to blocks 22, 23 fast on the ends of the half rings 5, 5', this connection being made by ball joint connections 21.

Spindle 14, which is rotatably mounted in a sleeve 15 but is constrained against axial movement relative to the sleeve, is provided at its outer end with a handle 16, the sleeve 15 being capable of angular movements about an axis transverse to the screwing axis, for which purpose it is provided with a trunnion type mounting 17 carried in brackets 18 on member M.

The collar 20 has diametrically opposed lugs 20' in which the anchor pins 13 for the links 11, 12 are secured, the links 11, 12 being pivotally connected at their other ends at 21 to the blocks 22, 23 attached respectively to the adjacent ends of rings 5, 5'. Dependent upon the direction of rotation of the handle 16, the ring parts 5, 5' can be displaced circumferentially within the guide faces 2, 3 so as to cause expansion or contraction of the ring element as a whole, and thus move it outwardly into engagement with the shoulder 10 or to withdraw it therefrom.

Provision is made for effecting an adjustment in the size of the ring and for this purpose one end (see FIGURE 3) is provided with a serrated surface 25 for co-operation with corresponding teeth on a part 26 integral with the block 23. Clamping screws 27 normally hold the two sets of teeth respectively on the parts 25, 26 in engagement but can be released to permit of any necessary adjustment in the overall size of the ring.

In order to provide an effective seal between the closure member M and the closure ring C, member M has a machined flat or seating surface 28 for engagement with a corresponding flat or seating surface on the ring C, a fluid tight seal being provided by an O-ring 30 mounted in a recess in ring C.

Provision may also be made for bleeding the pressure within the pipe and for this purpose there is provided an orifice 31 (FIGURE 2) which is normally closed by a ball valve 32 under the control of a screw adjustable plunger 33 carried by the rib 4. When the ball valve is held against its seating by the plunger 33 the interior of the pipe is sealed but, on release of the ball valve, pressure can escape through a bleed orifice 34.

I claim:

1. For a hollow vessel, a closure comprising a closure member, means defining in the vessel an orifice receiving said closure member, said orifice defining means comprising an outer peripheral shoulder defining an opening of sufficient size to pass the closure member, an inner peripheral shoulder defining an opening of insufficient size to pass the closure member and contacting the closure member when the latter is received within the orifice, and between said shoulders and adjacent said outer shoulder, a recessed portion defining an opening of greater size than that defined by said outer shoulder, a seating surface on said inner shoulder contacting a complementary seating surface on said closure member, an expansible and contractable ring member in contact with a peripheral surface on said closure member, said peripheral surface facing outward relative to the vessel, said ring member in its expanded condition having an outer periphery extending beyond the periphery of the closure member and, when the closure member is received by the orifice, beyond the opening defined by said outer peripheral shoulder and into said recessed portion of the orifice defining means, and in its contracted state an outer periphery not so extending, said ring member further presenting a radially outwardly directed peripheral surface inclined relative to the axis of the ring member and facing outwardly relative to both the vessel and the closure member, said inclined peripheral surface in its position corresponding to the expanded condition of the ring member being in wedging contact with an inwardly facing correspondingly inclined surface on the outer peripheral shoulder, and means for expanding said ring radially outwardly to bring said inclined peripheral surfaces into continued wedging engagement whereby said closure and vessel seating surfaces are held in intimate contacting relationship.

2. The closure of claim 1 wherein said expanding means includes a toggle linkage formed by a pair of links, one end of each link being pivotally connected to opposite ends of said ring member and the other ends of the links being in pivotal connection with an anchor member associated with screw actuator means carried by said closure member and having an axis of operation generally parallelling the axis of said ring member.

3. The closure of claim 1 wherein said ring member comprises a band of substantially rigid material having at least one gap into which is inserted an expansible and contractable element of said expanding means, said expansible and contractable element including a toggle linkage, said toggle linkage being comprised by a pair of links, one end of each link being in pivotal connection to the band on either side of the gap respectively and the other ends of the links in pivotal connection with an anchor member associated with screw actuator means located by said closure member and having an axis of operation toward and away from said ring member, said screw actuator means being a body pivotally located on a bracket on the closure member, a screw journalled in said body, means locating the screw against axial movement relative to said body, said anchor member being provided with an internally threaded bore receiving said screw, and the pivotal connection of at least one of said links to the band includes a member supporting the connection and securable at different positions on said band, whereby the over-all diameter of the band may be preadjusted.

4. The closure of claim 1 wherein said ring member is a band having at least one gap, said expanding means includes a toggle linkage, and means are provided between a link of said toggle linkage and an end of said band adjacent said gap for adjustably securing the link to said last-mentioned end at selected different distances from said gap.

5. The closure of claim 1 in which the ring member comprises a band of substantially rigid material having at least one gap into which is inserted an expansible and contractable element of said expanding means.

6. The closure of claim 5 in which the expansible and contractable element includes a toggle linkage.

7. The closure of claim 6 in which the toggle linkage comprises a pair of links, one end of each link being in pivotal connection to the band on either side of the gap respectively and the other ends of the links in pivotal connection with an anchor member associated with screw actuator means located by said closure member and having an axis of operation towards and away from said ring member.

8. The closure of claim 7 in which said screw actuator means comprise a body pivotally located on a bracket on the closure member, a screw journalled in said body, means locating the screw against axial movement relative to said body, said anchor member being provided with an internally threaded bore receiving said screw.

9. The closure of claim 5 in which the band is in two parts.

10. The closure of claim 7 in which at least the pivotal connection of at least one of said links to the band includes a member supporting the connection and securable at different positions on said band, whereby the overall diameter of the band may be preadjusted.

References Cited

UNITED STATES PATENTS

| 2,075,381 | 3/1937 | Vaughn | 292—256.69 |
| 2,093,787 | 9/1937 | Thomas | 292—256.69 |
| 2,281,145 | 4/1942 | Duey | 138—89 |
| 2,352,192 | 6/1944 | Gasche | 292—256.69 |
| 2,639,144 | 5/1953 | Long | 49—246 |
| 2,703,188 | 3/1955 | Blanchette et al. | 292—256.69 X |
| 2,140,456 | 12/1938 | Kaemmerling | 292—256.69 |
| 2,743,034 | 4/1956 | Wheatley | 138—89 X |
| 2,757,820 | 8/1956 | Wall | 292—256.69 X |
| 2,810,401 | 10/1957 | Stansbury | 138—89 |
| 2,852,295 | 9/1958 | Jasper | 292—256.67 |

FOREIGN PATENTS

| 23,619 | 8/1930 | Netherlands. |
| 777,733 | 6/1957 | Great Britain. |

HOUSTON S. BELL, JR., *Primary Examiner.*

U.S. Cl. X.R.

138—89; 292—256.69, 256.71; 49—208